(12) United States Patent
Erzgräber et al.

(10) Patent No.: US 8,100,444 B2
(45) Date of Patent: Jan. 24, 2012

(54) BUMPER SYSTEM FOR A MOTOR VEHICLE

(75) Inventors: Matthias Erzgräber, Darmstadt (DE); Theobald Hock, Grossostheim (DE); Heino Wentzien, Mainz (DE); Stefan Glaser, Schifferstadt (DE); Andreas Wüst, Zwingenberg (DE)

(73) Assignee: GM Global Technology Operations LLC, Detroit, MI (US)

( * ) Notice: Subject to any disclaimer, the term of this patent is extended or adjusted under 35 U.S.C. 154(b) by 19 days.

(21) Appl. No.: 12/096,901

(22) PCT Filed: Nov. 23, 2006

(86) PCT No.: PCT/EP2006/011222
§ 371 (c)(1),
(2), (4) Date: Feb. 10, 2009

(87) PCT Pub. No.: WO2007/068334
PCT Pub. Date: Jun. 21, 2007

(65) Prior Publication Data
US 2009/0200811 A1 Aug. 13, 2009

(30) Foreign Application Priority Data
Dec. 13, 2005 (DE) .......................... 10 2005 059 447

(51) Int. Cl.
*B60J 7/00* (2006.01)
(52) U.S. Cl. ........ 293/120; 293/115; 293/146; 293/154; 293/155
(58) Field of Classification Search .................. 293/115, 293/121, 146, 147, 148, 117, 120, 155, 154; 296/193.09, 193.1, 187.04, 187.09; 180/68.6
See application file for complete search history.

(56) References Cited

U.S. PATENT DOCUMENTS

| | | | |
|---|---|---|---|
| 6,394,512 B1 | 5/2002 | Schuster et al. | |
| 6,398,275 B1 * | 6/2002 | Hartel et al. | 293/102 |
| 6,428,065 B2 * | 8/2002 | Sato et al. | 293/121 |
| 6,447,049 B1 * | 9/2002 | Tohda et al. | 296/180.1 |
| 6,467,822 B1 | 10/2002 | Leng | |
| 6,634,702 B1 | 10/2003 | Pleschke et al. | |
| 6,676,179 B2 * | 1/2004 | Sato et al. | 293/115 |
| 7,185,946 B2 | 3/2007 | Cate et al. | |

(Continued)

FOREIGN PATENT DOCUMENTS
DE 10048902 C1 4/2002
(Continued)

OTHER PUBLICATIONS

German Patent Office, German Search Report for German Application No. 102005059447.6, Jul. 4, 2006.

(Continued)

*Primary Examiner* — Joseph Pape
(74) *Attorney, Agent, or Firm* — Ingrassia Fisher & Lorenz, P.C.

(57) ABSTRACT

A bumper system for a motor vehicle includes, but is not limited to, a bumper cross member, which is fixed to a stiff frame of the motor vehicle, a pliable bumper shell, a compressible structure which is formed between an upper area of the shell and the cross member and one support section which supports the lower area of the shell, which, together with a crash box holding the cross member is anchored to the flange plates of the frame.

8 Claims, 2 Drawing Sheets

U.S. PATENT DOCUMENTS

| | | |
|---|---|---|
| 2002/0101085 A1 | 8/2002 | Gehringhoff et al. |
| 2002/0190542 A1* | 12/2002 | Takeuchi et al. ............. 296/194 |
| 2006/0214439 A1* | 9/2006 | Reynolds ...................... 293/132 |

FOREIGN PATENT DOCUMENTS

| | | |
|---|---|---|
| DE | 10100875 A1 | 7/2002 |
| DE | 10154113 A1 | 5/2003 |
| DE | 102005018348 A1 | 11/2005 |
| DE | 102004007571 | 6/2008 |
| EP | 0652138 A1 | 5/1995 |
| EP | 1038732 | 9/2000 |
| EP | 1072476 A2 | 1/2001 |
| EP | 1103428 | 5/2001 |
| EP | 1286863 B1 | 3/2003 |
| EP | 1419936 A1 | 5/2004 |
| JP | 59006151 | 1/1984 |
| RU | 2142363 C1 | 12/1999 |
| WO | 0100478 A1 | 1/2001 |
| WO | 0187672 A2 | 11/2001 |
| WO | 02102646 A1 | 12/2002 |

OTHER PUBLICATIONS

International Searching Authority, PCT Search Report for PCT Application No. PCT/EP2006/011222, Mar. 8, 2007.

Chinese Patent Office, Chinese Office Action for Application No. 200680052765.3.

USPTO, U.S. Office Action issued in U.S. Appl. No. 13/075,689, dated Jul. 21, 2011.

* cited by examiner

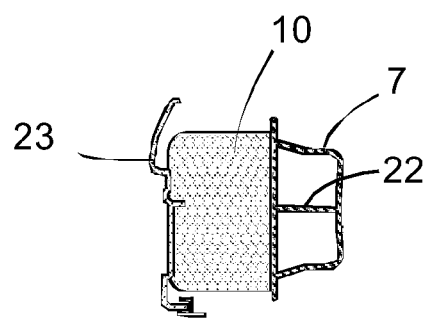
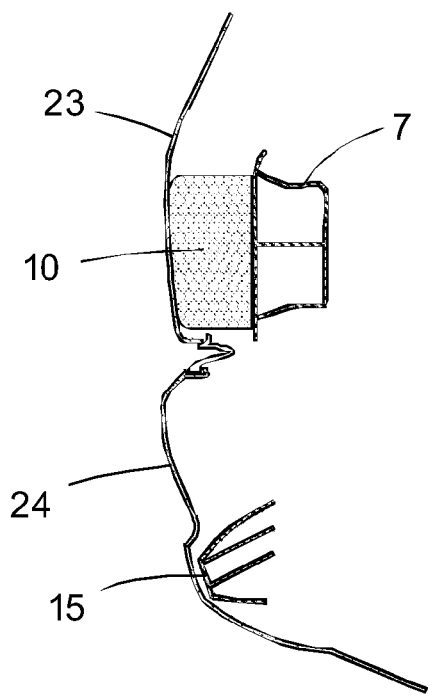
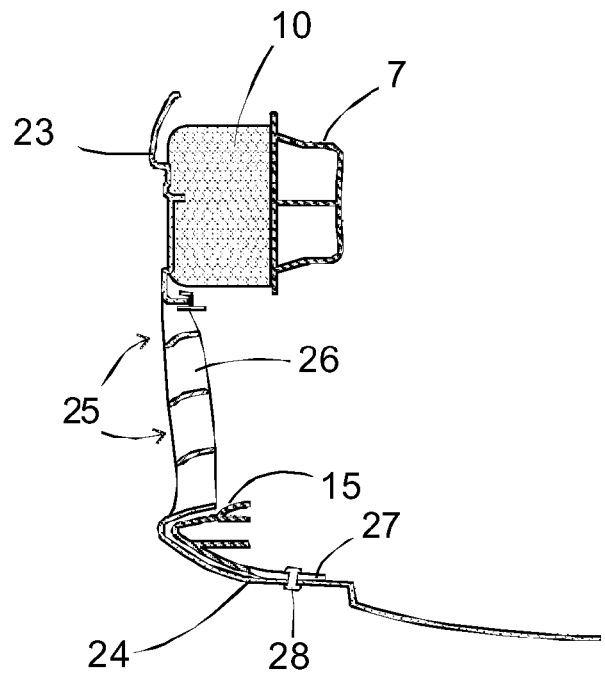

BUMPER SYSTEM FOR A MOTOR VEHICLE

CROSS-REFERENCE TO RELATED APPLICATIONS

This application is a U.S. National-Stage entry under 35 U.S.C. §371 based on International Application No. PCT/EP2006/011222, filed Nov. 23, 2006, which was published under PCT Article 21(2) and which claims priority to German Application No. 102005059447.6, filed Dec. 13, 2005, which are all hereby incorporated in their entirety by reference.

TECHNICAL FIELD

The invention generally relates to a bumper system, and more particularly to a bumper system for a motor vehicle.

BACKGROUND

Modern bumper systems for the front ends of motor vehicles generally comprise a vertically structured build, with an upper section which is constructed in order to intercept collisions with oncoming vehicles, and a lower section, which is constructed, in the event of a collision involving a pedestrian, to absorb the impact on the shin bone of a pedestrian to avoid deformation of the pedestrian's knee joint which in the event of an unprotected collision with the upper region of the bumper could lead to serious knee injuries.

Bumper systems of this kind are known from U.S. Pat. No. 6,467,822 B1, EP 1 286 863 A2 and EP 1 038 732 A1, for example. A bumper system according to the overall term of claim 1 is particularly known from U.S. Pat. No. 6,467,822.

The lower section of the outer shell support is fixed here either directly to the main chassis beam of the motor vehicle frame or to an assembly support. Directly fixing it to the main chassis beam often proves difficult for space reasons and for reasons of access. The manufacture of a special purpose assembly support is costly and increases the effort involved in the assembly of the automobile.

In view of the foregoing, at least one object of the invention is to particularize a bumper system which can be employed generally and is easy to assemble. In addition, other objects, desirable features, and characteristics will become apparent from the subsequent summary, detailed description, and the appended claims, taken in conjunction with the accompanying drawings and this background.

SUMMARY

The at least one object, other objects, desirable features and characteristics, is solved in that a motor vehicle bumper system that has a bumper cross member which is held on the stiff frame of the motor vehicle frame with a malleable bumper shell, a compressible structure configured between an upper area shell and the cross member, and a cross member and a support section that supports the lower area of the shell, the support section is fixed on the flange plates of the frame along with the crash-boxes which support the cross members.

Crash-boxes, which absorb the collision impact in motor vehicle collisions where minimal speed is involved, in order to protect the motor vehicle from damage, are common in modern motor vehicles. These crash-boxes are connected with the frame, particularly with main chassis beams of the frames and most often through flange plates. The invention simultaneously uses these usually readily available flange plates as connection points for a fastening support section, which supports the lower area of the shell.

The lower area of the bumper shell must, on the one hand, be flexible in order to avoid a very heavy impact on the leg of the pedestrian which could lead to serious injury; on the other hand, however, it needs to be stiff enough, in order to provide a noticeable delay while the compressible structure over it is compressed through the impact of the collision, in order to bend the knee joint and to prevent too great stress on the knee joint. In order to meet these requirements, the support section is preferably manufactured from a malleable plastic material.

The plastic involved can particularly be a polyamide, such as from the brand name Ultramid, sold by BASF AG.

In order to fulfill the stiffness requirements of the support section, the plastic used in its manufacture is preferably replaced with minimally flexible fibers, such as glass fibers.

For the purpose of simplifying the fixing of the support section to the crash boxes, flange plates, preferably, have an area which is over the cross section of the crash boxes, to which the support section is fixed.

The support section essentially includes a cross beam and two support arms which connect the cross beam with the flange plates.

In order to keep the support section light at the sufficient stiffness, the cross beam and the support arms are realized preferably as a C-profile or an I-profile, wherein outer webs of the C-profile continually overlap the outer web of every I-profile.

An additional stiffening of cross beams and support arms can be accomplished through the ribs that run between and parallel to the outer webs. These also preferably continually overlap between the cross beam and support arms, in order to achieve a homogeneous distribution of stress.

A, in top view, curved contour of the support arms, preferably an S-shaped contour, allows the support arms also to yield in case of a collision with a pedestrian.

BRIEF DESCRIPTION OF THE DRAWINGS

The present invention will hereinafter be described in conjunction with the following drawing figures, wherein like numerals denote like elements.

FIG. 5 shows a vertical segment through the front end of the motor vehicle with a bumper system according to an exemplary embodiment of the invention along a longitudinal center plane of the motor vehicle;

FIG. 6 shows a segment analogous with FIG. 5 along a section plane parallel to the section plane shown in FIG. 5; and FIG. 7 shows a segment analogous to FIG. 5 along a longitudinal center plane of the motor vehicle according to another exemplary embodiment of the invention.

DETAILED DESCRIPTION

The following detailed description is merely exemplary in nature and is not intended to limit application and uses. Furthermore, there is no intention to be bound by any theory presented in the preceding background or the following detailed description.

Figure 1:
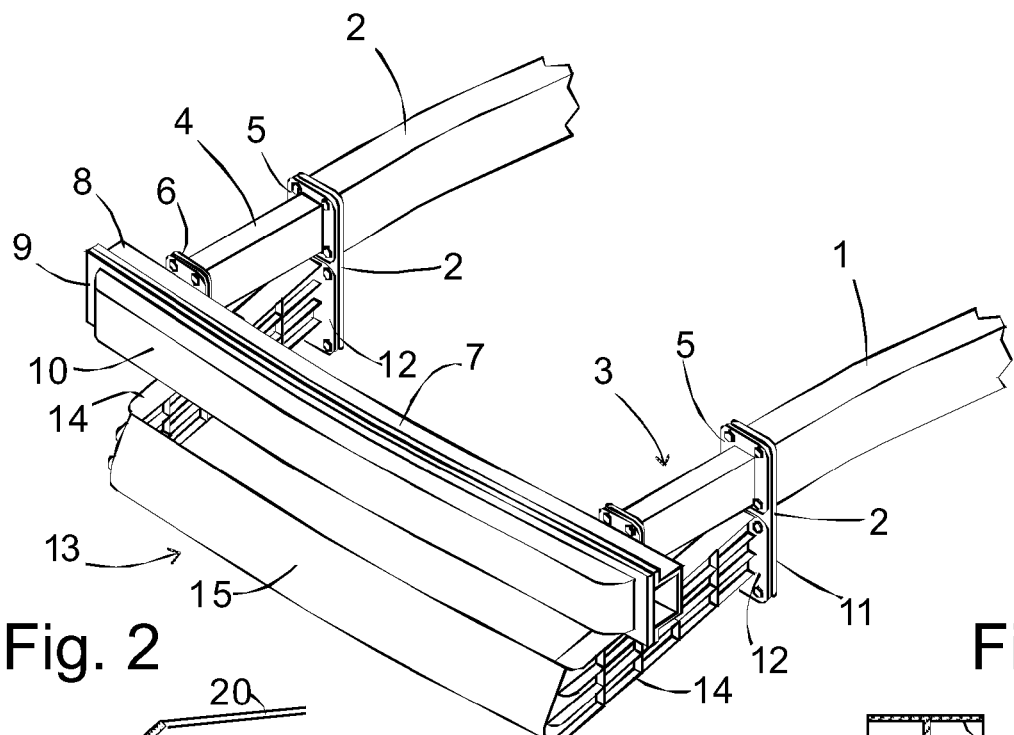
FIG. 1 shows a perspective view of a bumper system according to an exemplary embodiment of the invention in an initial configuration.

FIG. 1 displays a perspective view of the front areas of two main chassis beams 1, which are components of the support structure of a motor vehicle body. These main chassis beams 1 are provided, as is well known, with welded flange plates 2 on their front ends, on which the crash boxes 3 are fastened which elongate the main chassis beams 1. The crash boxes 3 are each formed by a square length of pipe 4, and whose load capacity is much smaller longitudinally than that of the main chassis beam 1 and which is locked on its two ends through flange plates 5, 6. The length of pipe 4 is displayed in the figure with even walls; the walls can, however, also comprise a curved contour, in order to improve the compressibility of the crash box 3. The back flange plate 5 is bolted to the locking flange plate 2 of the main chassis beam 1, the front flange plate 6 serves to fasten a bumper cross member 7. The bumper cross member 7 is a hollow metal structure able to withstand stress which, for example, as is shown in the figure, is formed by a profile 8 from essentially a U-shaped cross section, and a longitudinally stretched metal strip 9, whose free edges are welded together. On the front side of the strip 9 is a compressible structure, here indicated in the form of a body 10 made from an inelastic compressible foam material.

The flange plate 2 of the main chassis beam 1 is larger than required to fasten the crash box 3; on the face 11 of the downward facing flange plate 2 one further flange plate 12 can be found, which is the one piece component of a support section 13 made from glass fiber reinforced plastic, in particular polyamide. The support section 13 includes two support arms 14 which reach downwards and forwards from the flange plates 12 which are fastened to the main chassis beams and are connected to each other by means of a cross beam 15.

Because of the difference in height between the ends of the support arms 14 these are, in the event of a collision with a pedestrian, exposed not only to a force in their longitudinal direction but also with a bending momentum, which improves the elasticity of the support arms and thereby the elasticity of the entire bumper system.

The cross beam stretches, with respect to the longitudinal direction of the motor vehicle, in front of the bumper cross member 7 and is located perpendicularly underneath the compressible foam body 10. The cross beam 15 has, as is displayed in FIG. 2, a cross section with an outer bow 16 in the form of a C and the majority of the ribs 17 which stand apart from the concave side of the bow 16.

Figure 2:
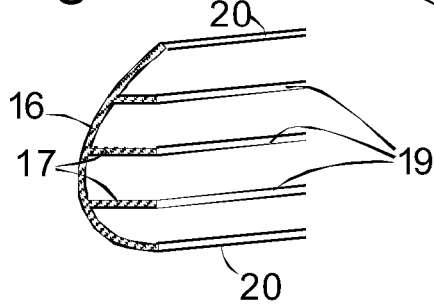
FIG. 2 shows a cut through the cross beam of a support section of the bumper system depicted in FIG. 1.
Figure 3:
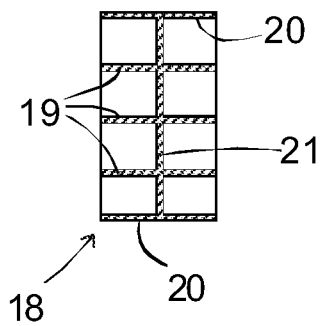
FIG. 3 shows a cut through a support arm of the support section.

As displayed in FIG. 3 the support arms 14 have a cross section in the form of an I-profile 18 from whose vertical central planet carrier 21, parallel ribs stand away in the opposite direction. As can be seen in FIG. 2 the ribs 19 attach smoothly on the inside of the I-profile to the ribs 17 of the cross beam 15, and the upper and lower ends of the bow 16 overlap in parallel horizontal planet carriers 20 of the I profile 18 in order to be able to lead the impact in the case of a collision into the support arms 14 and through these into the main chassis beam before the connection between the cross beam 15 and the support arms 14 gives way.

Figure 4:
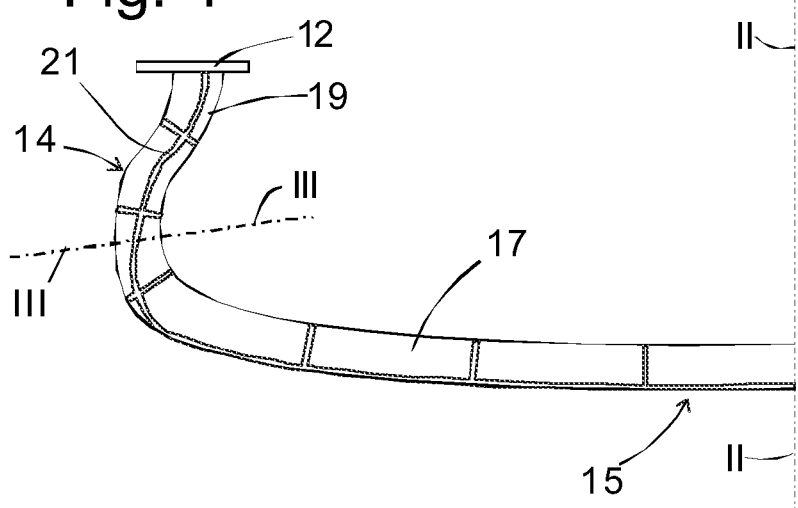
FIG. 4 shows a longitudinal section view through a support section according to a second exemplary embodiment of the invention.

A second embodiment of the support section 15 is displayed in FIG. 4 in a half longitudinal section, wherein a dashed line marked with II-II indicates a symmetrical level of the support section 13. The cross section of the support section along the symmetry level II-II corresponds to the cross-section displayed in FIG. 2; a section along the level marked with III-III corresponds to the one shown in FIG. 3. The vertical planet carrier 21 of the support arm 14 has, in top view, when running from the flange plate 12 an S-shaped curved contour, and goes smoothly over the bow 16 of the cross beam 15. The S-shaped curved contour of the support arm makes it easier for it to yield flexibly under a force impacting the front of the motor vehicle.

The same effect can also of course be achieved with supporting arms curved when seen from a side view, preferably curved in an S-shape (not shown in a Figure).

FIGS. 5 and 6 display strongly schematic section views of the front end of a motor vehicle body along its longitudinal center plane or a parallel level to this. The bumper cross member 7 essentially has the same structure as is shown in FIG. 1, however with an additional horizontal intermediate wall 22 which stretches through the inner hollow of the bumper cross member 7, in order to stiffen it. An upper area 23 of a flexible shell made from plastic is connected with the cross member 7 over the compressible foam body 10. A lower area 24 of the shell is hung up on the cross beam 15 by encompassing wholly its front side. Between the upper and lower areas 23, 24 there are air vents 25.

In a collision of the vehicle with a pedestrian, the upper area of the shell is flexible and gives way under the impact of the collision with the pedestrian, wherein the foam body 10 is compressed. The lower level 24, which is supported by the cross beam 15, is firmer in comparison, so that the force, which impacts the shin of the pedestrian is stronger than the force which impacts the knee or upper thigh through the upper area 23. In this way, the pedestrian's leg bends and a strain on the knee joint is avoided when the pedestrian hits the hood.

FIG. 7 like FIG. 5 shows a schematic section through the front end of a motor vehicle body along its longitudinal center plane according to a slightly modified embodiment. A frame which goes around the air vent 25 or a vertical brace, marked 26, which divides it, stiffens the shell and increases its load capacity in a vertical direction. Its lower area 24 encompasses the cross beam 15 entirely. On the lower edge of the cross beam 15 one or more springy brackets 27 are formed, on which, by means of bolts 28, rivets or similar, the shell is connected. When the cross member 15 gives way downwards in the case of a collision with a pedestrian, this leads to a tensile load on the shell. The shell therefore serves to stiffen the support section 13, so that the desired amount of stiffness of the support section 13 is achieved with minimal effort and materials as opposed to an embodiment where the shell and the support section are not fastened to each other.

Of course one could provide a corresponding fastening of the shell directly on the cross beam 15 without brackets 27. However, the brackets are preferred because they allow the bolts 28 or other fastening devices to be placed far to the back of the motor vehicle, in a place where they are not visible for a viewer standing in front of the motor vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit scope, applicability, or configuration in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

LIST OF REFERENCES main chassis beam 1
flange plate 2 crash box 3
pipe 4
flange plate 5, 6
cross member 7
profile 8
metal strips 9
body 10
face 11
flange plate 12
support section 13
support arm 14
cross beam 15
bow 16
rib 17
I-profile 18
rib 19
planet carrier 20, 21
intermediate wall 22
upper area 23
lower area 24
air vents 25
brace 26
bumper bracket 27
bolts 28

The invention claimed is:

1. A bumper system for a motor vehicle, comprising:
a stiff frame of the motor vehicle having flange plates for connecting to the stiff frame;
a bumper cross member and crash-boxes, the bumper cross member operably connected to the stiff frame by the crash-boxes;
a malleable bumper shell;
a compressible structure configured between an upper area of the malleable bumper shell and the bumper cross member; and
a support section supporting a lower area of the malleable bumper shell, wherein both the support section and the crash-boxes are fastened to the flange plates of the stiff frame, and wherein the support section includes a cross beam and two support arms each extending rearwardly from the cross beam to connect the support section with the flange plates, and the cross beam and the support arms are respectively configured to include a C-Profile and an I-Profile, wherein the C-Profile has outer webs that overlap with the I-Profile, and wherein the cross beam has cross beam ribs that run between the outer webs and the support arms have support arm ribs that run along an inside of the I-Profile, the cross beam ribs and the support arm ribs are cooperatively configured to stiffen the cross beam and the support arms.

2. The bumper system according to claim 1, wherein the support section is made in one piece from an elastic plastic material.

3. The bumper system according 2, wherein the plastic material is polyamide.

4. The bumper system according to claim 2, wherein the plastic material is mixed with fibers.

5. The bumper system according to claim 1, wherein the support section is fixed on a lower area of the flange plates adjacent to the crash-boxes which are fixed on an upper area of the flange plates.

6. The bumper system according to claim 1, wherein the cross beam ribs overlap with the support arm ribs.

7. The bumper system according to claim 1, wherein the support section and the crash-boxes are separately fastened to the flange plates of the stiff frame.

8. The bumper system according to claim 1, wherein the crash-boxes are each configured as a section of pipe extending longitudinally between the support section and one of the flange plates of the stiff frame.

\* \* \* \* \*